(12) United States Patent
Obermann (10) Patent No.: US 7,354,083 B1
(45) Date of Patent: Apr. 8, 2008

(54) PROTECTIVE GUARD ASSEMBLY FOR VEHICLES

(76) Inventor: Stuart W. Obermann, 13016 Monte Vedra, Huntsville, AL (US) 35803

( * ) Notice: Subject to any disclaimer, the term of this patent is extended or adjusted under 35 U.S.C. 154(b) by 116 days.

(21) Appl. No.: 11/158,672

(22) Filed: Jun. 22, 2005

Related U.S. Application Data (60) Provisional application No. 60/581,899, filed on Jun. 22, 2004.

(51) Int. Cl.
*B60R 19/48* (2006.01)
*B60R 13/04* (2006.01)

(52) U.S. Cl. .................................... 293/128; 293/126

(58) Field of Classification Search ............... 293/128, 293/126, 21, 22, 23, 187.12; 296/187.12
See application file for complete search history.

(56) References Cited

U.S. PATENT DOCUMENTS

| | | | |
|---|---|---|---|
| 3,718,357 A | 2/1973 | Hertzell | |
| 4,221,410 A | 9/1980 | Dawson | |
| 5,518,283 A | * | 5/1996 | Egelske ..................... 293/128 |
| 6,893,079 B1 | * | 5/2005 | Johnson et al. ......... 296/187.12 |

* cited by examiner

*Primary Examiner*—Hilary Gutman
*Assistant Examiner*—Melissa Black
(74) *Attorney, Agent, or Firm*—Lanier Ford Shaver & Payne P.C.; Angela Holt (57) ABSTRACT

A protective guard assembly for the protection of vehicles from parking lot damage is provided. The protective apparatus may comprise a pair of extendable rotator arms with a tensioned cable extended therebetween. In its non-deployed position, the present invention may be mounted underneath the vehicle to maintain the outer appearance of the vehicle. In its deployed position, the present invention may provide a pair of fore and aft canted arms with the tensioned cable therebetween, such arms having extended from underneath said vehicle and rotated upward to extend said cable at approximately the height of the outermost portion of the generally curved vehicle body. Alternatively, the present invention may comprise a pair of shorter extendable arms rotated in an upward manner and extended from each of the front and rear bumpers, or extended from and retracted into the front and rear bumpers, along the side of the vehicle. The user may then manually extend a cable from one of said arms to the other and temporarily affix it thereto.

18 Claims, 6 Drawing Sheets

PROTECTIVE GUARD ASSEMBLY FOR VEHICLES

BACKGROUND OF THE INVENTION

1. Field of the Invention

This invention generally relates to an apparatus for the protection of vehicles. In particular, the present invention relates to an apparatus for the protection of vehicle bodies from damage due to impact. More particularly, the present invention relates to a automobile body guard system for the protection of vehicles from damage due to impacts from adjacent automobile doors, shopping carts, or other vehicles or moving objects which could scratch, damage, or otherwise mar the finish, paint, or metal of the protected vehicle.

2. Prior Art

Various attempts have been made to protect the doors and side panels of a vehicle from being dented, dinged, or nicked when persons carelessly open the doors of adjacent vehicles and allow the edges to strike the door or side panel of the subject vehicle. The most simplistic of these attempts includes new car manufacturers and/or automobile dealers attaching protective molding along the sides and door panels of vehicles to prevent nicks or small dents on the larger exposed areas of the same. While these side molding strips offer some degree of protection, they are normally quite narrow and generally extend less than one inch outward from the surface of the side or door panel. Further, the variety of shapes, heights and sizes of doors for various vehicles do not necessarily correspond, and therefore oftentimes the positioning of these protective moldings fails to stop the contact.

Numerous other prior art attempts, including retractable side guard protectors or bumpers, have also been made. For example, Hertzell, U.S. Pat. No. 3,718,357, relates to a retractable side bumper guard assembly attached to the underside of the vehicle and extended using hydraulics. The Hertzell apparatus essentially comprises a hinged baseboard extendable on two hydraulic actuated arms from underneath the vehicle that once extended pivot about its hinges to protect the lower surface of the door frame. Hertzell fails to provide any protection to the upper portion of the doors or quarter panels that need it most, and that on most vehicles, tend to extend outwardly the furthest, thereby making them more vulnerable to dings and dents. In addition, many modern vans, sport utility vehicles (SUVs) and four-wheel drive vehicles are substantially higher than the average passenger sedan or coupe, and therefore the doors of such taller vehicles would clear the top edge of such a design, and therefore could damage the door or side panels of a typical passenger vehicle.

Egelske, U.S. Pat. No. 5,518,283, relates to a protective assembly comprising an elongated bar rotatably mounted within the wheel wells and driven by both a mechanical and an electrical connection to the vehicle's drive shaft. Egelske, however, suffers from several shortcomings. First, Egelske provides protection only for that portion of the vehicle that lies between the innermost edges of the vehicle's wheel wells. Second, the apparatus of Egelske may serve as a potential operational hazard to the vehicle as a threat to the vehicle's tires integrity during radical maneuvering or to the drive system of the vehicle through its direct connection thereto. Furthermore, each of the designs referenced above are likely to cause interference with the jack points on a typical modern vehicle, which are often located just inside of the front and rear tire wells.

SUMMARY OF THE INVENTION

The present invention recognizes and addresses various of the foregoing limitations and drawbacks, and others, concerning present methodologies and apparatus for the protection of a vehicle body.

It is, therefore, a principal object of the present invention to provide a generic apparatus for the protection of a vehicle, including, but not limited to, automobiles, trucks, SUVs, vans, buses, recreational vehicles, and utility trailers for hauling boats and other marine vehicles, and car trailers. More particularly, it is an object of the present invention to provide an apparatus for the simultaneous protection of both a vehicle door and quarter panels. In such context, it is still a more particular object of the present invention to provide such an apparatus that is fully automatic.

It is another principal object of the present invention to provide an apparatus that is suitable for use on all vehicle types and sizes. It is a further object of the present invention to provide an apparatus that is concealed during non-use. In such context, it is an object of the present invention to provide an apparatus that can be mounted underneath the vehicle.

It is yet another principal object of the present invention to provide an apparatus operable to protect the sides of vehicles that may self-deploy based on an indication of a vehicle parking within a predefined range. It is a further object of the present invention to provide an apparatus that can be deployed using a remote device, either a dedicated remote control for the protection system or by using the same system widely used for locking and unlocking vehicle doors, trunks, or setting anti-theft alarm systems. In such context, it is an object of the present invention to provide such an apparatus that will automatically deploy under predefined conditions, but which may be overridden to deploy only upon the activation of a remote.

Additional objects and advantages of the invention are set forth in, or will be apparent to those of ordinary skill in the art from, the detailed description as follows. Also, it should be further appreciated that modifications and variations to the specifically illustrated and discussed features and materials hereof may be practiced in various embodiments and uses of this invention without departing from the spirit and scope thereof, by virtue of present reference thereto. Such variations may include, but are not limited to, substitutions of the equivalent means, features, and materials for those shown or discussed, and the functional or positional reversal of various parts, features, or the like.

Still further, it is to be understood that different embodiments, as well as different presently preferred embodiments of this invention, may include various combinations or configurations of presently disclosed features, elements, or their equivalents (including combinations of features or configurations thereof not expressly shown in the figures or stated in the detailed description hereof).

These and other features, aspects, and advantages of the present invention will become better understood with reference to the following descriptions and appended claims. The accompanying drawings, which are incorporated in and constitute a part of this specification, illustrate an embodiment of the invention and, together with the descriptions, serve to explain the principles of the present invention.

In a first exemplary embodiment of the present invention, there may be provided a fully automatic apparatus for the protection of a vehicle. While the description of such first exemplary embodiment is limited to the operation of the present invention on only one side of a vehicle, it should be noted that the present invention is envisioned as being suited for functional protection of the outer periphery of a vehicle, including the sides, front and back as desired and provided for by the user. The first exemplary embodiment may comprise a fully self-contained and inconspicuously stored apparatus comprising two retractable rotator arms, one near each wheel well that are joined together by an extendable tension cable. Upon deployment, the present invention may automatically extend outward from the vehicle the two rotator arms. After reaching their outward most extension, the two rotator arms may then rotate upward through a generally vertical path and, in the case of a side-mounted apparatus as shown in the figures, the arms may rotate continue to rotate outward toward the front and rear of the vehicle, respectively, on multi-axis hinge systems as are known in the art. After reaching its fully deployed position, the present invention may further comprise an electromechanical actuator for retracting the extendable cable. Such cable may be retracted through one of the rotator arms, which may be hollow, or through an alternative arrangement that is suited to place the cable in tension. One such alternative would allow for the use of small pulleys mounted to the rotator arm to constrain the direction of motion of the cable while allowing it to be maintained in tension at least in part by the rotator arm.

The system may be activated using either the same electrical signals which control the power locks of the automobile or may be operated by a remote control. In general, the system will additionally comprise a control unit encompassing a programmable CPU suitable for defining triggering characteristics upon which the system will either deploy or remain in its stowed position. Additionally, the system may be provided with an override or disable characteristic for use by the vehicle operator. Generally, in its default mode, the present invention will fully deploy to protect the vehicle when it is parked and locked with all doors closed and locked. Upon receipt of a signal that a door has become unlocked, the CPU of the present system may operate to immediately reverse the deployment process and retract the present invention beneath the vehicle to its stored condition. Preferably, for such a fully automatic process, in those vehicles provided with a remote or keyless entry device, an additional button may be added thereto to actuate and deactivate the present system, or may be operated using the existing lock/unlock or alarm setting buttons.

In a second exemplary embodiment, there may be provided an apparatus as described above that may be provided with an additional activation mechanism. In this second exemplary embodiment, detection devices may be provided for use by the system to determine if another vehicle has been parked within a predefined proximity to the protected vehicle using ultrasonic detectors or other proximity detection devices. If the present invention detects that the protected vehicle is parked and locked, and it detects another vehicle within the predefined proximity, the present invention may be allowed to deploy either on the threatened side of the vehicle or on both sides of the vehicle. Such detection system would allow a driver to leave a vehicle parked and locked in an isolated location, such as the owner's own garage, without deploying the present system on either side. If a second vehicle is unexpectedly parked within the predefined proximity to the protected vehicle, the present invention may then automatically deploy in such a manner so as to protect either that side of the vehicle on which the threat exists or on both sides of the vehicle. The detection system herein described may utilize ultrasonic distance detection devices similar in configuration to the "backup detection" systems currently used on high-end automobiles to aid with parallel parking.

In a third exemplary embodiment of the present invention, there may be provided a semi-automatic version or alternatively, a fully manual variation of the present invention. In such third embodiment, extendable arms may be provided from both the front and rear bumpers of the vehicle. Such arms may be automatically extended in any of the manners described above for the other alternative embodiments or may be suited for manual activation. Attached to one of the two extendable arms may be provided an extensible cable with an attachment means at the end thereof. In this present exemplary embodiment, a user would be required to manually pull the extensible cable from one extendable arm to the other and mechanically fasten it thereto to provide protection for the full length of the vehicle. The cable may be maintained on a pre-tensioned spool so as to automatically maintain the cable in tension when fastened to the distal extendable arm. Alternatively, as above described, a sensor may be provided for detecting the affixation of the cable to the distal extendable arm so as to trigger a CPU to activate an electro-mechanical actuator to tension the spool upon which the cable is stored.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters throughout the present specification and appended drawings is intended to represent the same or analogous features or elements of the invention.

DETAILED DESCRIPTION OF THE PREFERRED EMBODIMENTS

Reference will now be made in detail to presently preferred embodiments of the invention, examples of which are fully represented in the accompanying drawings. Such examples are provided by way of an explanation of the invention, not limitation thereof. In fact, it will be apparent to those skilled in the art that various modifications and variations can be made in the present invention, without departing from the spirit and scope thereof. For instance, features illustrated or described as part of one embodiment can be used on another embodiment to yield a still further embodiment. Still further, variations in selection of materials and/or characteristics may be practiced, to satisfy particular desired user criteria. Thus, it is intended that the present invention cover such modifications and variations as come within the scope of the present features and their equivalents.

Figure 1:
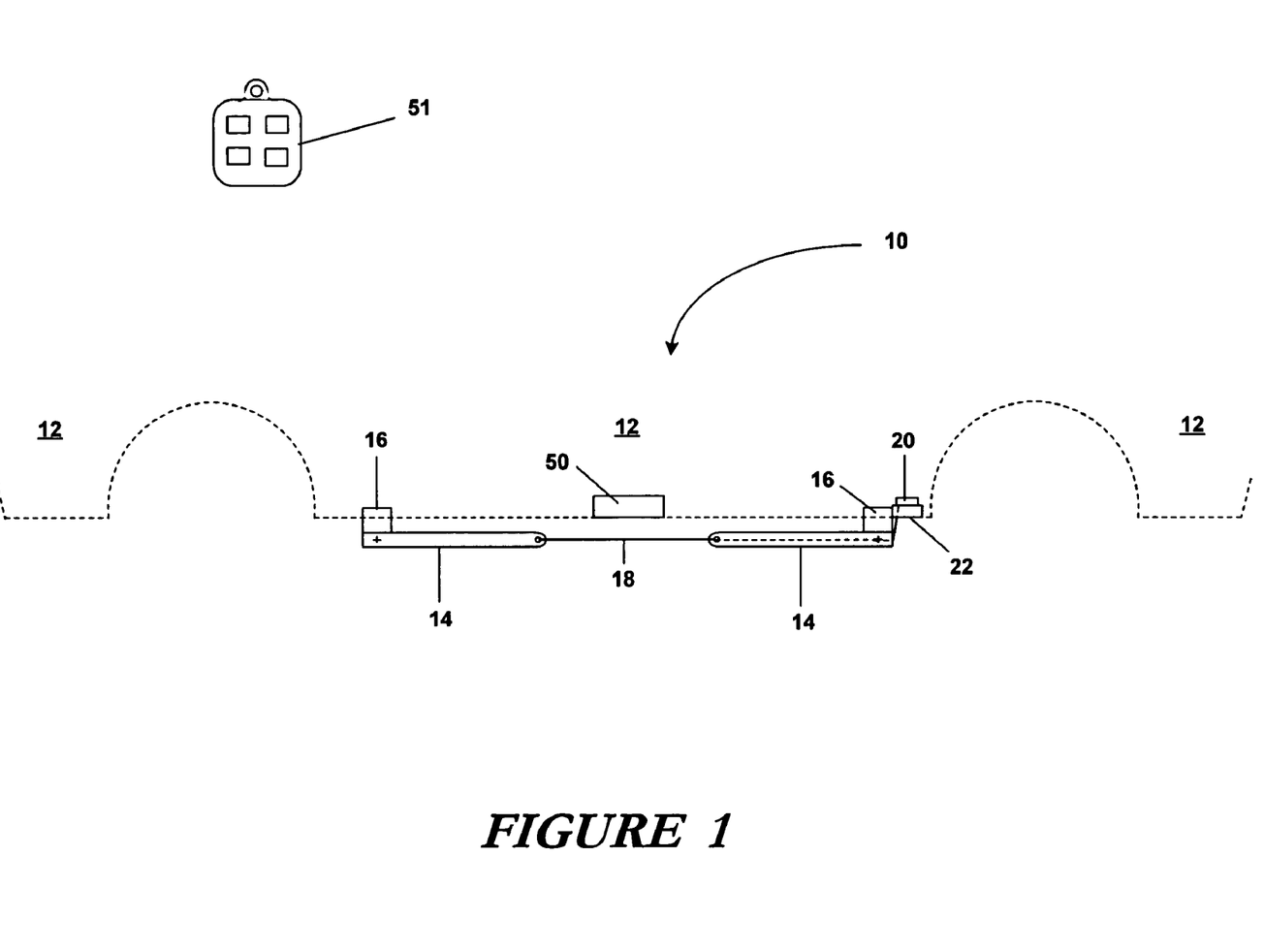
FIG. 1 is a side view of a first embodiment of a protective guard assembly in its stored position in accordance with the present invention and an exemplary remote/keyless entry device suitable for use with the present invention.

As disclosed above, the present invention is particularly concerned with a protective guard assembly 10 for vehicles 12 and, in particular, is concerned with a protective assembly 10 for preventing impact damage to a vehicle 12 when it is stationary. As best seen in FIG. 1, one alternative embodiment of the present invention comprises a plurality of extendable rotator arms 14 located beneath the vehicle 12 along its length. Each rotator arm 14 is rotationally connected to a multi-axis electro-mechanical actuator 16 that serves to both extend and rotate along/about axis A-A such arms 14. Stretched between said arms is a cable 18 of sufficient tensile strength to serve as a barrier to large surface area moving objects that pose a potential impact threat to the protected vehicle 12.

While the present description will be limited to the operation of the present invention on only one side of the vehicle 12, it should be noted that the present invention 10 is envisioned as functioning to protect both sides of the vehicle 12. It should be noted, however, as above described, under certain circumstances the present invention 10 may be activated on only one side of the vehicle 12. Additionally, as all vehicles are generally different, the size, angles of deployment of the arms 14, etc are vehicle specific and except in general form no particular part of the present invention.

Figure 2:
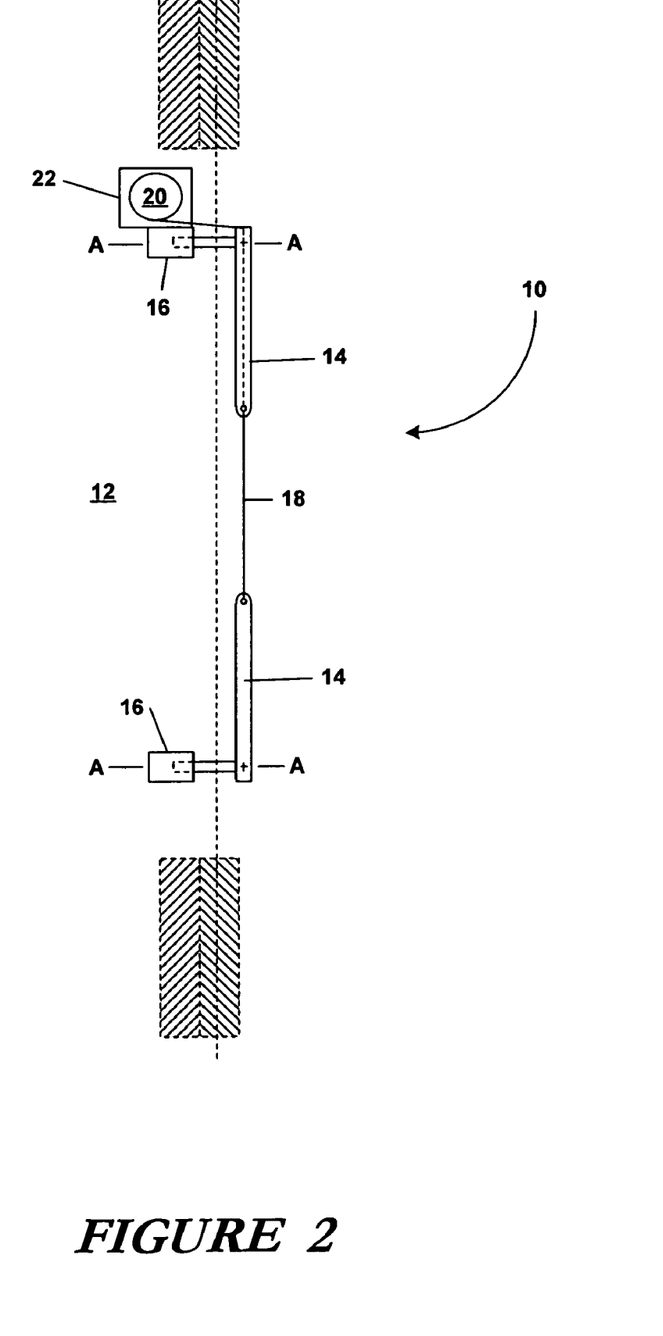
FIG. 2 is a is an overhead view of the first embodiment of the protective guard assembly of FIG. 1 in a partially deployed position in accordance with the present invention.

Upon receipt of an actuating signal, the multi-axis electro-mechanical actuator 16 associated with each rotator arm 14 serves to extend the rotator arms 14 from underneath the vehicle 12. In their stored position, each rotator arm 14 is generally parallel with the ground as shown in FIGS. 1 and 2. Upon on reaching the point of their greatest extension, the multi-axis electro-mechanical actuators 16 serve to rotate their respective rotator arm 14 along a generally vertical path toward the end of the vehicle 12 closest to their respective actuator 16.

Figure 3:
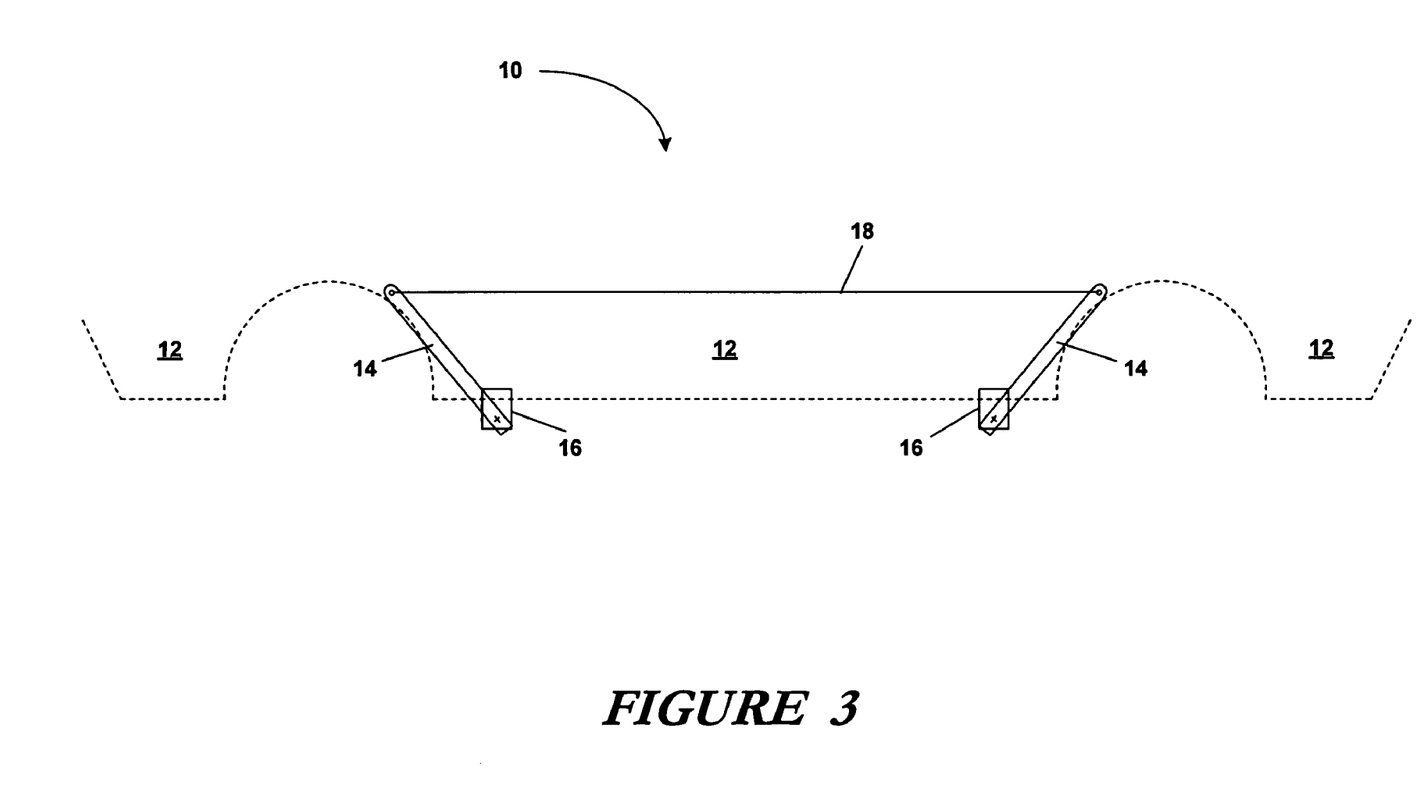
FIG. 3 is a side elevation view of the first embodiment of the protective guard assembly of FIG. 1 in a partially deployed position in accordance with the present invention.

As seen in FIG. 3, a cable 18 is extended between the ends of the rotator arms 14 furthest from their respective actuator 16. The cable 18 may typically be a braided steel or stainless steel cable encased in a plastic or rubber insulation sheath, although it may be constructed from a wide variety of other materials. Such cable 18 may be affixed to either the front or rear rotator arm 14. The cable 18, however, is not affixed to both arms 14. In a first variation of the first embodiment, the cable 18 may extends into and through the hollow interior of the rotator arm 14 to which it is not affixed. Such cable 18 is mounted on a spool 20 adjacent to the hollow rotator arm 14. In a second variation of the first embodiment, the cable may be alternatively constrained, such as through the use of small pulleys mounted to the exterior of a solid rotator arm to constrain the direction of motion of the cable while allowing it to be maintained in tension at least in part by the rotator arm. In each variation, the spool 20 is free to spin such that during the deployment of the present invention 10 the cable 18 is allowed to extend itself to cover the growing distance between the outermost ends of the extended rotator arms 14. Similarly, the cable 18 is free to be collected on the spool 20 as the distance between the ends of the rotator arms 14 narrows during the storage of the present invention 10.

In each above variation, the spool 20 is rotatably connected to an associated electro-mechanical actuator 22 that serves to tighten the cable 18 by collecting it back onto the spool 20 after deployment of the rotator arms 14 so as to place the cable 18 under tension. In this manner, the cable 18 serves as a barrier to objects that may inadvertently approach and impact the vehicle 12.

It should be noted that no specific size or distances have been recognized in the description of the present invention. As above described the length, shape and curvature of the rotator arms 14, the distance which they extend from the side of the vehicle 12, the degrees of rotation they pass through to reach their final placement and the length and tension of the cable 18 are vehicle specific and the present invention is intended to cover all of the general variations without exception.

The actuation of the present invention may be triggered by any of a number of methods. First, the preferred method of activation is the use of a remote/keyless entry device 51 that has been afforded an additional activation button specifically for the present invention, or may use the existing lock/unlock or alarm buttons on the remote device 51. This allows a user to manually activate the apparatus and to avoid any interaction with doors, passers-by, and/or other vehicles, if the space immediately adjacent the vehicle 12 to be protected is not clear. A second alternative embodiment of the present invention, as shown in part in FIG. 4, includes the use of a plurality of sensors located generally in pairs 42, 44, or 46 along the side of the vehicle 12 to detect the presence of a threat to the vehicle 12 within a predefined perimeter. Alternatively, a single wide-angle sensor 48 that is capable of detecting threats across the entire length of the vehicle 12 may be employed. In operation, a vehicle 12 enhanced with such embodiment of the present invention may be parked without the system 10 already deployed and if another vehicle parks with a pre-defined distance, the sensors 42, 44, 46, or 48 may detect the vehicle and automatically activate the protective guard assembly 10.

Figure 4:
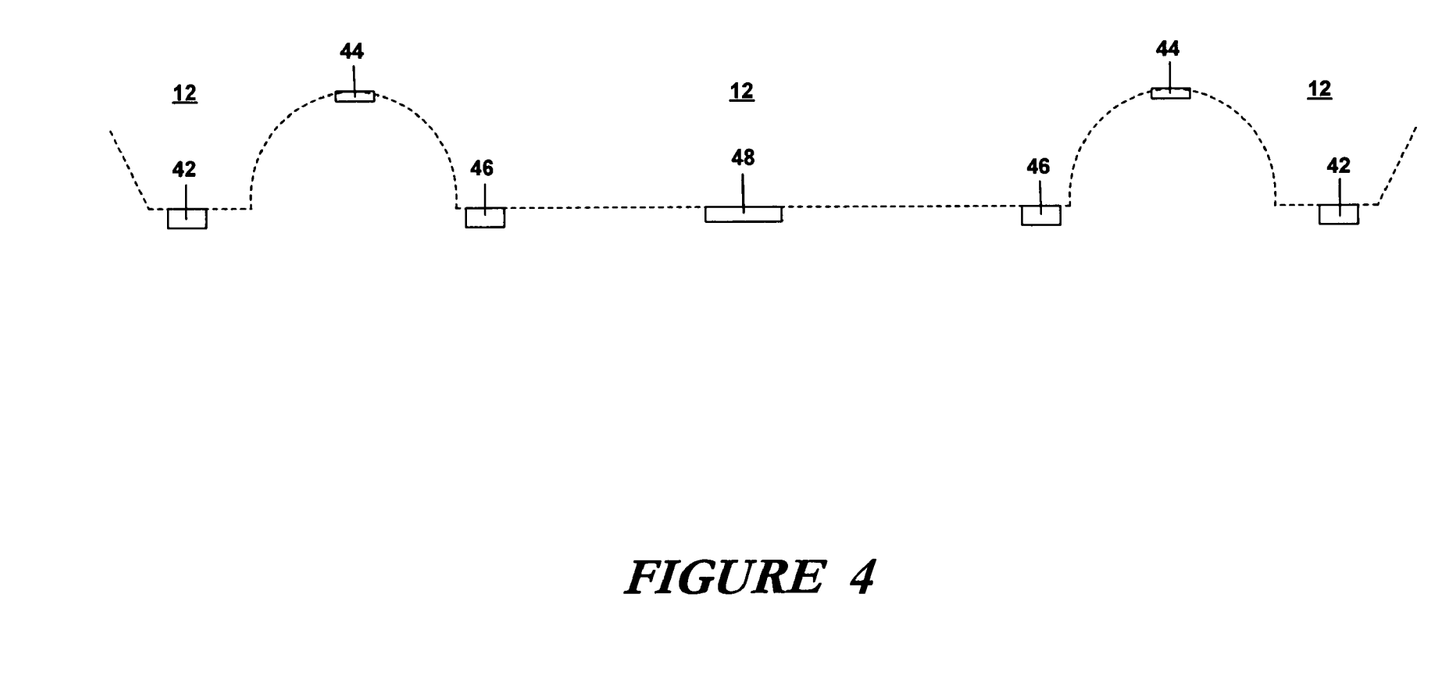
FIG. 4 is a side elevation view of various possible locations for detectors for use with a second alternative embodiment of the present in which the protective guard assembly may be automatically deployed in response to an intrusion into a predetermined perimeter.

In order to achieve the intuitive control required to allow for self-activation, the second embodiment of the present invention is provided with a direct control central processing unit (CPU) 50. Such CPU 50 is programmable for any of numerous activation sequences and allows for virtually unlimited criteria for deployment. For instance, in addition to the above-described automatic deployment scenario, the present invention may be programmed to seek electronic indicator signals from the vehicle 12 that it is in "Park" and that all the vehicle doors are closed and locked. Upon receipt of such indication or after some pre-defined period immediately following such indication, the present invention 10 may automatically deploy itself to protect the vehicle 12. Similarly, the system 10 may deploy or be retracted upon receipt of a signal from the remote control device 51.

Figure 5:
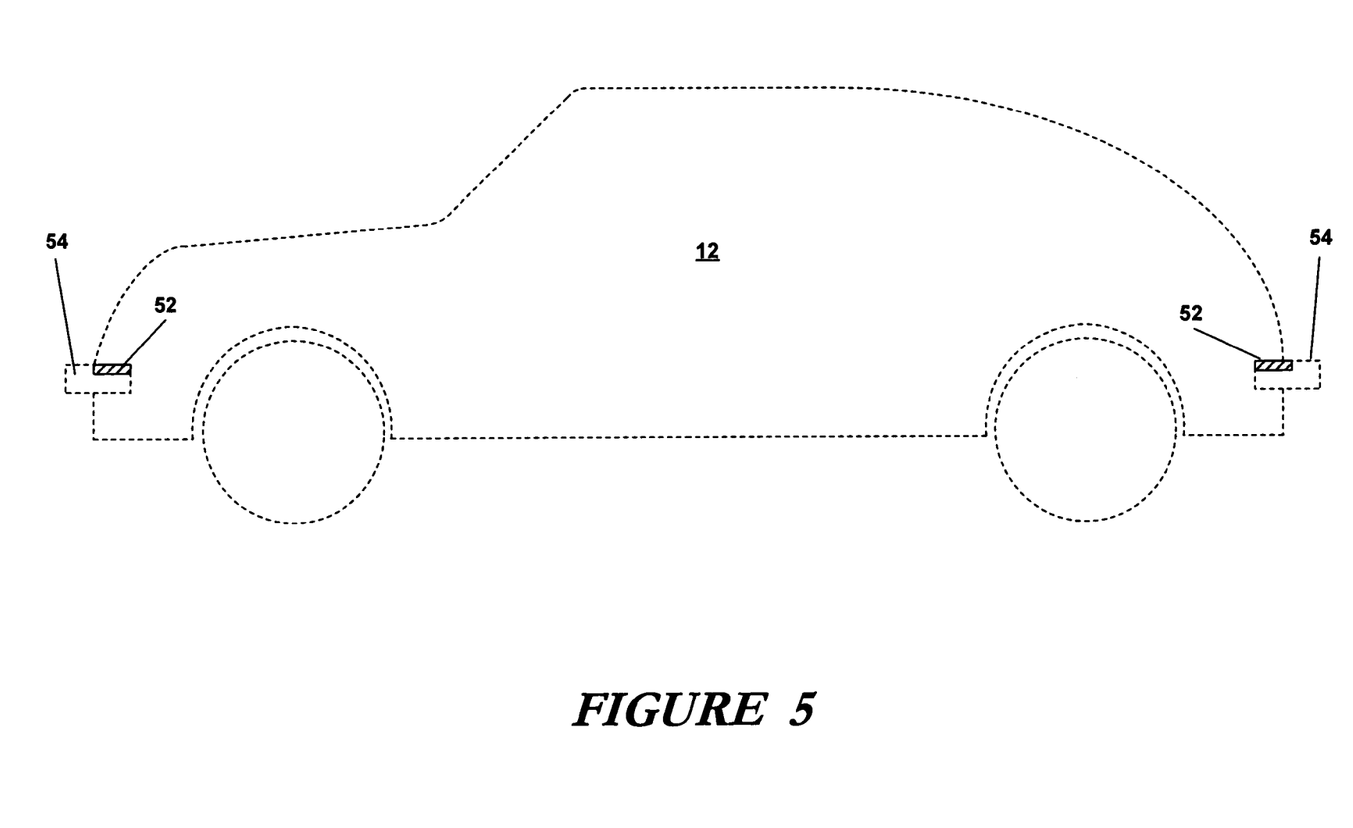
FIG. 5 is a side elevation view of a third alternative embodiment of the present invention in its stowed position.
Figure 6:
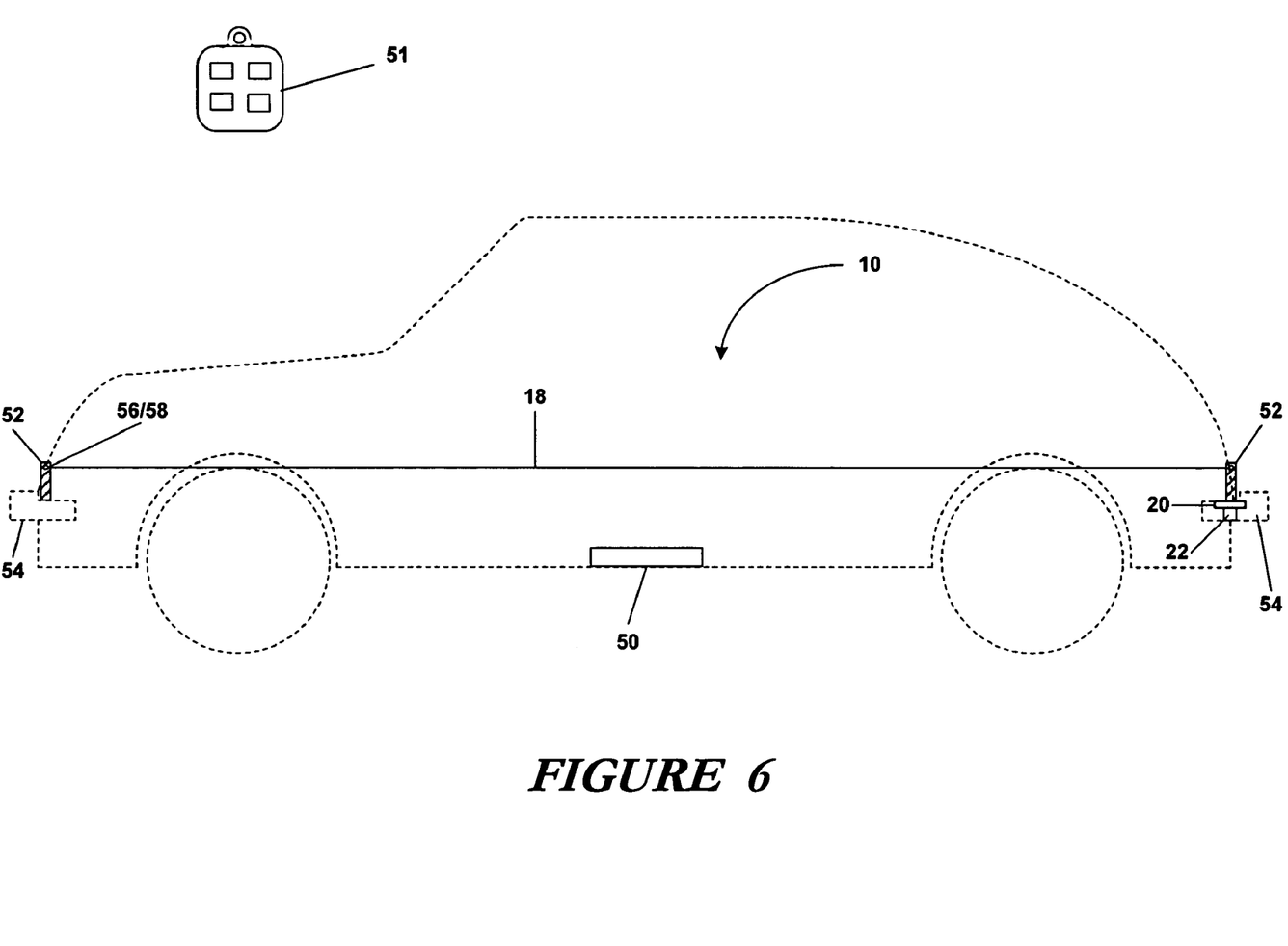
FIG. 6 is a side elevation view of the embodiment shown in FIG. 5 in its fully deployed position.

As seen in FIGS. 5 and 6, a third alternative embodiment of the present invention may be provided in which instead of being mounted under the vehicle 12 extendable arms 52 are mounted within the bumpers 54 of the vehicle 12 and extend out either upon receipt of an actuation signal or upon manual manipulation. In this alternative embodiment, one of the extendable arms 52 serves merely as a mechanical fixture for the affixation of the tensioned cable 18. The other arm 52 serves to present the cable 18 with its free end 56 and attachment means 58 to the user. The user must manually extend the cable 18 from one arm 52 to the other arm 52 and fasten it thereto. As above described the cable 18 may be mounted on a spool 20 and the spool 20 may be rotatably connected to an electro-mechanical actuator 22 that serves to tension the cable 18 after it is attached to the receiving extendable arm 52. In a first variation of the present alternative embodiment, the spool may be pre-tensioned so as to always maintain the cable in a tensioned state. Alternatively, in a second variation of the present alternative embodiment, a CPU 50 may be provided for receipt of an activation signal, such as from a remote device 51 to extend the arms 52. Regardless of the semi-automatic or fully manual nature of the extendable arms 52, the cable must be extended by the user in the present embodiment. In the second variation of the present alternative embodiment, the CPU 50 may also be used to control the electro-mechanical actuator 22 associated with the spool 20 so as to tension the cable 18 after its physical connection to the other arm 52. In both variations, the present invention 10 serves to protect effectively the entire length of the vehicle 12 from impact damage.

Although a preferred embodiment of the invention has been described using specific terms and devices, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of various other embodiments may be interchanged both in whole or in part. Therefore, the spirit and scope of the appended claims should not be limited to the description of the preferred version contained herein.

What is claimed is:

1. A vehicle protection assembly comprising:
   a plurality of arms, each of said arms having a first end and a distal end;
   a multi-axis electro-mechanical actuator associated with each of said arms for extension and rotation of said arms during stowage or deployment of the assembly, wherein said arms are attached to their respective actuator at their first end;
   a cable affixed to the distal end of at least one of said plurality of arms;
   wherein at least one of said plurality of arms is hollow; and
   wherein said cable is stored on a spool and passes through said hollow arm to another of said plurality of arms.

2. The vehicle protection assembly of claim 1, wherein said spool is free to spin during activation and deactivation of the assembly to dispense and collect the cable and wherein said spool is associated with a fixed actuator for tensioning the cable after deployment.

3. A vehicle protection assembly comprising:
   a plurality of arms, each of said arms having a first end and a distal end;
   a multi-axis electro-mechanical actuator associated with each of said arms for extension and rotation of said arms during stowage or deployment of the assembly, wherein said arms are attached to their respective actuator at their first end;
   a cable affixed to the distal end of at least one of said plurality of arms;
   wherein at least one of said plurality of arms further comprises a cable maintenance assembly affixed thereto.

4. The vehicle protection assembly of claim 3, wherein said cable maintenance assembly comprises a plurality of pulley wheels for maintaining said cable along a predefined path of operation.

5. The vehicle protection assembly of claim 4, wherein said cable is stored on a spool and passes through said cable maintenance assembly to another of said plurality of arms.

6. The vehicle protection assembly of claim 5, wherein said spool is free to spin during activation and deactivation of the assembly to dispense and collect the cable and wherein said spool is associated with a fixed actuator for tensioning the cable after deployment.

7. A vehicle protection assembly comprising:
   a pair of arms, each of said arms having a first end and a distal end;
   activation means associated with each of said pair of arms for deploying and stowing said assembly, wherein said arms are attached to the activation means at their first end;
   a retractable cable extending between the distal ends of said pair of arms;
   wherein the pair of arms deploys from a substantially horizontal position to a position rotated more than ninety-degrees from the horizontal position.

8. A vehicle protection assembly comprising:
   a plurality of arms, each of said arms having a first end and a distal end;
   a multi-axis electro-mechanical actuator associated with each of said arms for extension and rotation of said arms during stowage or deployment of the assembly, wherein said arms are attached to their respective actuator at their first end;
   a retractable cable affixed to the distal end of at least one of said plurality of arms.

9. The vehicle protection assembly of claim 8, wherein said assembly is mounted beneath a vehicle body.

10. The vehicle protection assembly of claim 9, wherein multiple assemblies are mountable to said vehicle body to operate independently or jointly to protect multiple sides of the vehicle.

11. The vehicle protection assembly of claim 9, wherein deployment of the assembly is triggered by an electronic signal to the actuators.

12. The vehicle protection assembly of claim 10, wherein said signal is generated by a remote control.

13. The vehicle protection assembly of claim 10, wherein said signal is an electronic signal indicating the vehicle doors are closed and locked and in automatic vehicles, the vehicle is in Park, and in manual vehicles, the parking break is set.

14. The vehicle protection assembly of claim 8, wherein the length, shape and curvature of said arms are vehicle specific.

15. The vehicle protection assembly of claim 8, wherein at least one of said plurality of arms is hollow.

16. The vehicle protection assembly of claim 8, wherein said arms are integral with the bumpers of the vehicle.

17. The vehicle protection assembly of claim 16, wherein deployment of said assembly is manual.

18. The vehicle protection assembly of claim 16, wherein deployment of said assembly is entirely automatic and wherein such automatic deployment is performed only upon receipt of an appropriate electronic signal.

* * * * *